United States Patent
Tsang et al.

(10) Patent No.: US 7,800,349 B2
(45) Date of Patent: Sep. 21, 2010

(54) VOLTAGE DIP AND UNDERVOLTAGE COMPENSATOR

(75) Inventors: Kai Ming Tsang, Hong Kong (HK); Wai Lok Chan, Hong Kong (HK)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 377 days.

(21) Appl. No.: 11/701,479

(22) Filed: Feb. 2, 2007

(65) Prior Publication Data

US 2008/0186009 A1 Aug. 7, 2008

(51) Int. Cl.
*G05F 1/14* (2006.01)
(52) U.S. Cl. ............... 323/255; 323/301; 363/56.05
(58) Field of Classification Search ........... 323/284, 323/207, 209, 216, 255, 301; 363/56.05, 363/34, 35, 37, 55; 327/62, 63, 69, 70; 324/605, 324/606; 336/137
See application file for complete search history.

(56) References Cited

U.S. PATENT DOCUMENTS

| 4,587,474 | A | * | 5/1986 | Espelage et al. ............ 318/709 |
| 5,402,057 | A | * | 3/1995 | D'Aquila et al. ............ 323/211 |
| 5,786,684 | A | * | 7/1998 | Bapat ........................ 323/258 |
| 5,808,454 | A | * | 9/1998 | Chung ....................... 323/255 |
| 5,821,739 | A | * | 10/1998 | Imoto ........................ 323/258 |
| 6,118,676 | A |   | 9/2000 | Divan et al. |
| 7,504,806 | B2 | * | 3/2009 | Labuschagne .............. 323/255 |
| 2005/0040655 | A1 | * | 2/2005 | Wilkins et al. ............... 290/44 |

* cited by examiner

*Primary Examiner*—Harry Behm
*Assistant Examiner*—Matthew Grubb
(74) *Attorney, Agent, or Firm*—The Hong Kong Polytechpic University (57) ABSTRACT

The present invention relates a system for compensating for a voltage dip and undervoltage containing a primary side and secondary side transformer, a voltage dip/swell detector, and a level detector/switch selector device, wherein the secondary side of the transformer possesses a minimally sufficient number of taps to allow the system to be modified to meet supply voltage dips. The system, in particular, allows for long term compensation of voltage dips and quick adjustment of load voltage, usually within one cycle. Methods of using the present invention are also presented.

6 Claims, 6 Drawing Sheets

Channel 1 - load voltage
Channel 2 - supply voltage

FIG. 7

Channel 1 - load voltage
Channel 2 - supply voltage

FIG. 8

VOLTAGE DIP AND UNDERVOLTAGE COMPENSATOR

BACKGROUND

Current voltage dip compensators are generally of the storage type, such as capacitors or flywheels. The response times of these voltage dip compensators can be quick, however their effectiveness normally last for a very short duration, which is dependent on the size of the storage element. Because the physical size of storage elements are limited, current voltage dip compensators often fail to compensate for a voltage drop in a supply voltage if the duration of the voltage dip last longer than the storage element is able to compensate. It is therefore desirable to have a simple and low cost compensator which can tackle a voltage dip and undervoltage that could last for a long period of time.

It is an object of the present system to overcome the disadvantages and problems in the prior art.

DESCRIPTION

The present invention proposes a system for compensating for a voltage dip or undervoltage, such system capable of compensating for a significant period of time through the incorporation of a detector and switch selector.

The present invention also proposes a method of compensating for a voltage dip or undervoltage in a supply voltage, such method capable of continually adjusting to meet the needs of the load voltage.

The present invention further proposes the incorporation of a detector within the system, such detector suitable for generating a error voltage, to be used in determining whether to adjust the system and by which factor.

These and other features, aspects, and advantages of the apparatus and methods of the present invention will become better understood from the following description, appended claims, and accompanying drawings where:

Through the present invention, the term "nominal" shall refer to a value or level set by a particular government or entity, for example "nominal supply voltage" refers to the supply voltage level or minimum set by a government entity in a particular locale.

The term "undervoltage" shall refer to the delivery of a voltage below its nominal value for a length of time exceeding a few seconds, for example 5 minutes, 30 minutes, 24 hours, or 48 hours.

The term "voltage dip" shall refer to the delivery of a voltage below its nominal value for a length of time not exceeding 1 minute.

The present invention relates to supply voltage dip compensators and undervoltage compensators. In accordance with the present invention, if a voltage dip voltage can be detected effectively and efficiently, the level of compensated voltage can be obtained. By passing the supply voltage through an appropriate transformer winding, a load voltage can be maintained to its nominal value. Prior to instant invention being actuated, the voltage, through the present invention, can have a variation of between ±1 to 5%; preferably, the variation is between ±1 to 3%. Upon the voltage going outside of this parameter, the voltage dip or undervoltage will be detected. In detecting the voltage dip or undervoltage effectively, a voltage dip/swell detector is included, the detector comprised of at least a relay circuit, an inverter, a low pass filter, and absolute value generators. Generally, two signals are generated through the detector; one, a rectified supply voltage signal and a reference supply voltage signal. The two signals are compared via a comparator, and the resultant signal, i.e., error voltage, is passed forward for a determination of if the swell or dip is outside an acceptable range, and if so, how to compensate therefor. Compensation is performed by activating any one of a number of electronic switches, such switches corresponding to a tap position on the secondary side transformer of the system. It has been found that with a minimally, sufficient number of taps, a load voltage can be maintained to be less than a 5% deviation from the nominal value of the supply voltage, even in view of a 60% dip in the supply voltage.

Figure 1:
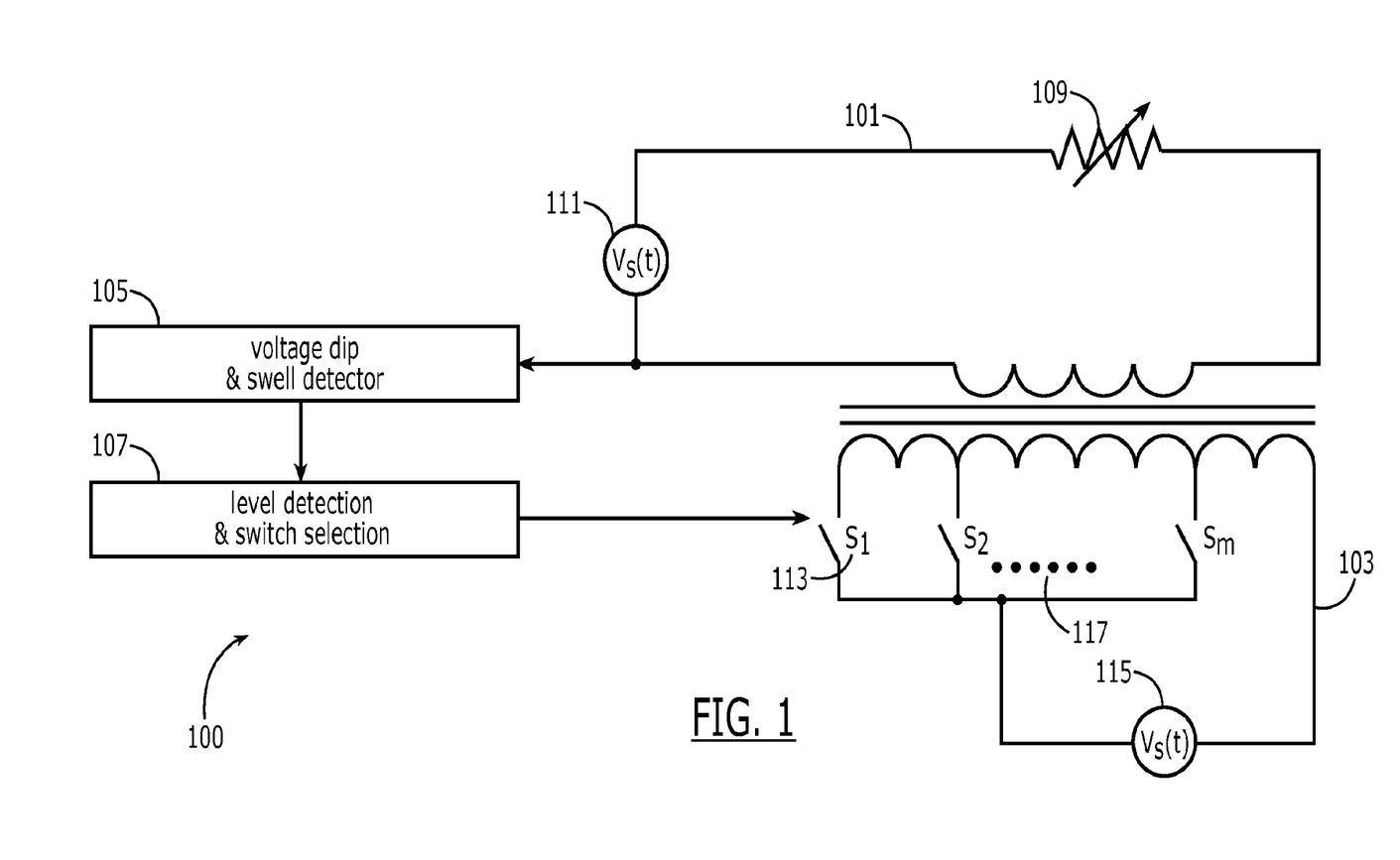
FIG. 1 shows an embodiment of the system of the present invention.

Now, to FIGS. 1-8,

FIG. 1 is an embodiment of a system 100 of the present invention, containing a primary side 101 of a transformer, a second side 103 of the transformer, a voltage dip/swell detector 105, and a level detector/switch selection device 107. In this embodiment, the detector 105 reads the supply voltage 111 directly.

The primary side 101 delivers AC supply power to a load 109. The primary side 101 preferably delivers such supply voltage between ±1 to 5% of the nominal AC input voltage level. Additionally, the primary side 101 can include electronic devices, such as resistors, including variable resistors (rheostat). In another embodiment, the primary side 101 can include surge protectors, for example circuit breakers implemented in a conventional manner (not shown). The primary side 101 obtains its voltage from a power source, for example a power station or power substation.

The primary side 101 is electronically coupled to a voltage dip/swell detector 105 through conventional methods. The detector 105 provides a means for determining a change in the source voltage 111 as provided to the primary side 101. Through the detector 105, the reference signal of the source voltage at a given time is compared with a rectified signal of the source voltage to determine whether the source voltage is exhibiting a dip or undervoltage above an acceptable range.

The detector 105 creates an error voltage through the use of a comparator, such as a subtractor. Whereas the implementation of a subtractor is known in the art, in one embodiment of the invention, the subtractor accepts one absolute value of the reference signal and the rectified signal. Due to the subtraction of one absolute value from the other, the comparator will emit an error voltage that is either positive, negative, or negligible. A positive or negative error voltage corresponds to the reference signal being higher or lower than the rectified signal. Where such error voltage is negative, a dip or undervoltage has occurred in the supply voltage 111.

To the detector 105 is electronically coupled a level detection/switch selector device 107. The device 107 is used for accepting an error voltage from the detector 105, determining whether the error voltage is within the operating parameter of the nominal supply voltage, and activating a switch if necessary.

The level detection of the device 107 is used for gauging the level of the error signal and determining whether it is outside an acceptable range, for example ±1 to 10% of the nominal supply voltage. In one embodiment, the acceptable range is ±3 to 5% of the nominal supply voltage. If the error voltage is outside such range, it will activate an electronic component for example a switch, which will require the switch selector of the device 107 to operate. If the error voltage is not outside the range, the switch will not activate.

As stated, the switch selector of the device 107 will initiate if the error voltage is outside the acceptable range (as determined by the level detection). The switch selector aspect will turn on a specific switch located on the secondary side in response to the error voltage. In one embodiment, switch selection will be made based upon the level of the error voltage, i.e., the higher the measured error voltage, the higher the switch selected. As the switch selector may choose among a variety of switches, of course the device 107 is connected to a multi-tap secondary side transformer.

The secondary side 103 is a multi-tap transformer, containing a sufficient number of taps to accommodate dips or unders in supply voltage 111. A sufficient number of taps 117 generally refers to the number of taps necessary to allow a voltage to be delivered to a load within ±1 to 5% of the nominal value of the supply voltage, regardless of the level of voltage dip or undervoltage. In one embodiment, a sufficient number of taps 117 refers to the number of taps necessary to allow the voltage to be delivered to a load within ±3 to 5% of the nominal value of the supply voltage in view of a 5% to 65% dip in supply voltage. Whereas the prior art was limited by not being able to address such a range for a significant period of time, the present invention can address such a undervoltage or dip range for a length of time ranging from a few seconds to 48 hours, and upwards. In one embodiment, the sufficient number of taps to allow the voltage to be delivered to a load within ±3 to 5% of the nominal supply voltage is 14.

The secondary side 103 further may include surge protection devices, such as fuses. The secondary side 103 delivers a nominal supply voltage 111 to attached loads.

Figure 2:
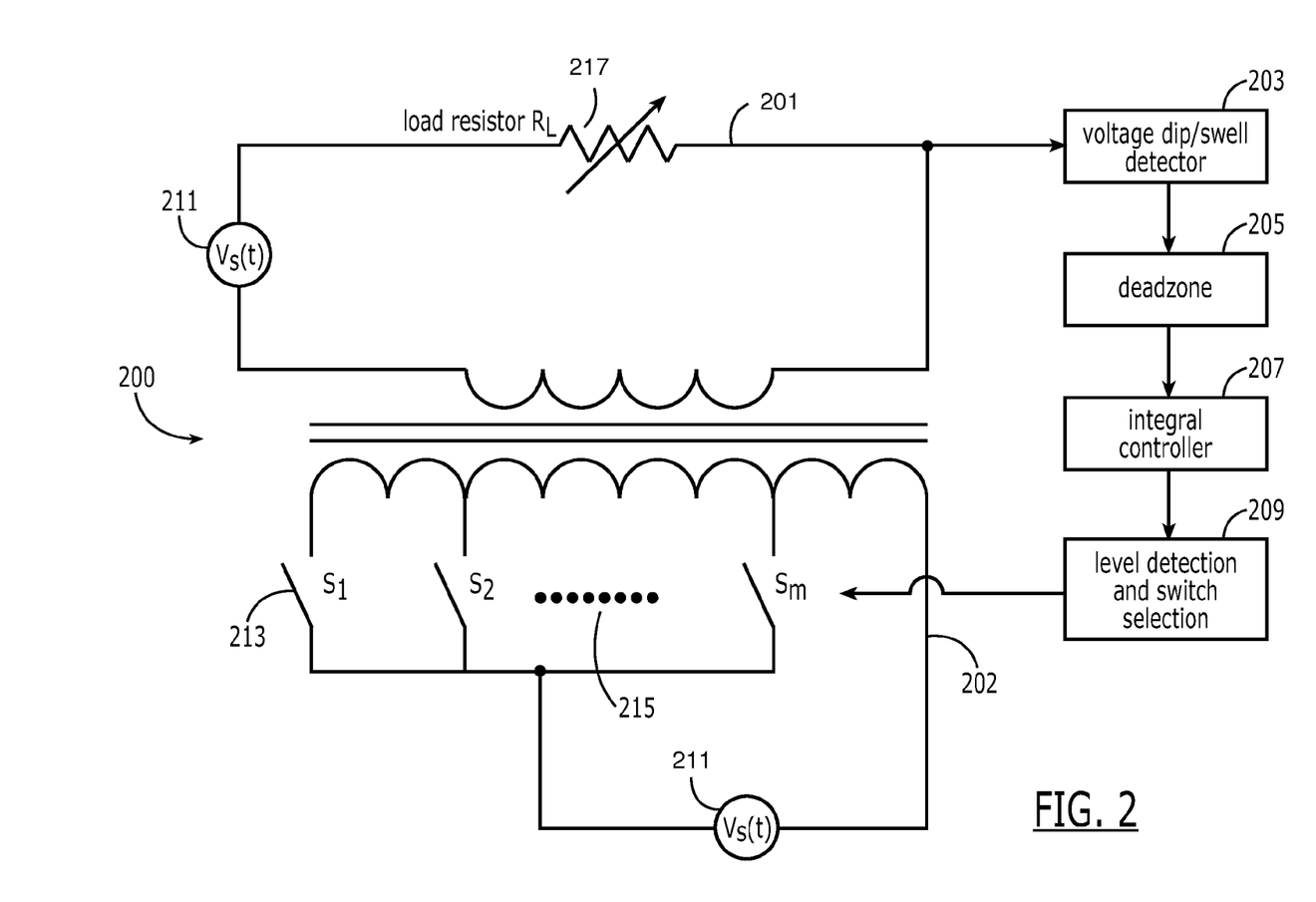
FIG. 2 shows another embodiment of the system of the present invention.

FIG. 2 is another embodiment of the system 200 of the instant invention. The system 200 is comprised of a primary side 201 of a transformer, a voltage dip/swell detector 203, a deadzone 205, an integral controller 207, a level detection/switch selection device 209, and a secondary side 202 of the transformer. In this embodiment, the detector 203 reads the load voltage directly.

As stated previously, the primary side 201 delivers a supply voltage 211 to the system 200 from a power source. A voltage dip/swell detector 203 is electronically coupled to the primary side 201, for detecting a voltage dip or undervoltage delivered from the load voltage 217. In this system 200, a deadzone 205 is implemented to set the rules for when the load voltage should be adjusted. The deadzone 205 rules are created to allow a percentage deviation of the load voltage based upon the nominal supply voltage 211. The deadzone 205 can be set between ±1 to 5% of the nominal voltage. In another embodiment, the deadzone 205 is set between ±3 to 5% of the nominal voltage.

An integral controller 207 follows such deadzone 205, such integral controller 207 being positioned to interact with load voltage signals occurring outside of the deadzone 205. Further, as the necessity to turn off a switch following the return of the load voltage signal to its nominal operating parameter is required but does not automatically occur, the integral controller 207, through loop functionality, can continue to pass a signal to the level detector/switch selection 209, such loop function being equal to about 1 to about 1.5 cycle of oscillation. Following the loop functionality, the voltage signal within the acceptable parameter is delivered prompting the switch 213 to turn off.

As stated earlier, the level detection/switch selection device 209 is used for determining the level of the error voltage and selecting an appropriate switch. The device 209 is electronically coupled to the secondary side 202. The secondary side may contain switches numbering from 1 to m, where m is a sufficient number to maintain a load voltage between ±3 to 5% of the nominal supply voltage. In one embodiment, m is 14.

Figure 3:
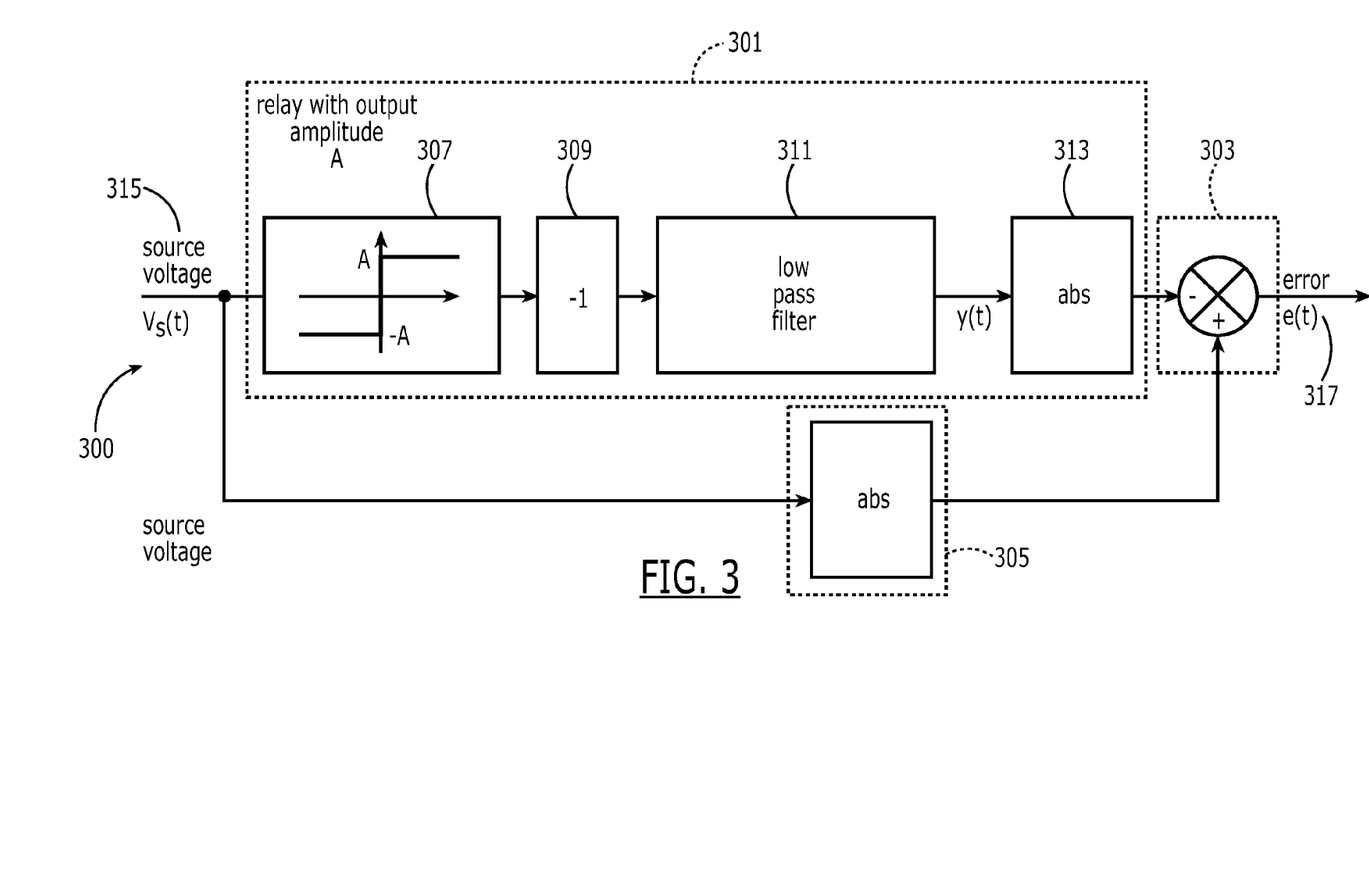
FIG. 3 sets for the detector as used in the present system.

FIG. 3 is a schematic of the voltage dip/swell detector 300 as used in the present invention. The detector 300 contains at least 3 sections, including fixed magnitude sinusoidal signal generator 301, a comparator 303, and an absolute value generator 305 for the reference signal.

The fixed magnitude sinusoidal signal generator 301 is used for accepting a voltage signal 315, modifying the voltage signal, and delivering it to the comparator 303 for comparison against the reference signal. The generator 301 can, in one embodiment, comprise a relay circuit 307, an inverter 309, a low pass filter 311, and an absolute value generator 313. The relay circuit 307 can be used to generate a square wave signal. The generation of a square wave signal creates a desired sinusoidal signal of the source voltage 315. Such a relay circuit 307 may be solid state, or microprocessor device. Further, the relay circuit 307 can be a relay with hysteresis. In general, the relay circuit 307 provides a square-shaped wave, with both positive and negative portions. In one embodiment, the relay circuit 307 may receive the source voltage 315 directly from the primary side of the transformer. In another embodiment, the relay 301 may receive the source voltage 315 through an instrument transformer (not shown), such instrument transformers including a voltage transformer, and coupling capacity voltage transformer. In yet another embodiment, the relay circuit 307 can receive a load voltage signal.

A waveform inverter 309 is electrically coupled with the relay 307. The inverter's 309 purpose is to provide a phase shift of the square wave by 180°. In another embodiment, the inverter 309 is included inside the housing of the relay circuit 307.

Following the inverter, a low pass filter 311 is coupled thereto. The low pass filter 311 will further provide a phase shift of 180° to the signal, and allow only low frequencies to pass through for further processing. The low pass filter 311 can be any used in the art, for example Butterworth approximated filters, Chebyshev approximated filters, Cauer approximated filters, and Bessel approximated filters. The orders can be of n, where n=$3^{rd}$ order, $4^{th}$ order, or above with a cutoff at the supply voltage frequency, generally 50 Hz or 60 Hz depending on the particular locale. An example of circuitry suitable for use as low pass filter is a Sallen and Key low pass circuit. In one embodiment, the filter is based upon Butterworth approximations to the $4^{th}$ order.

The absolute value 313 of the fixed magnitude sinusoidal signal, which is now in phase with the source voltage 315, is then generated for delivery to the comparator 303.

Simultaneous to the generation of the absolute value fixed magnitude sinusoidal signal 313, the absolute value of the reference signal 305 is generated and delivered to the comparator 303.

The comparator 303 is used to compare the two delivered voltages, and produce an error voltage e(t) 317. The error voltage e(t) 317 is a representation of the difference between 313 and 305, most notably in the equation;

$$305-313=e(t)$$

e(t) will be used to compensate or recompensate for the dip or swell in the supply voltage.

The comparator 303 is a subtractor.

Figure 4:
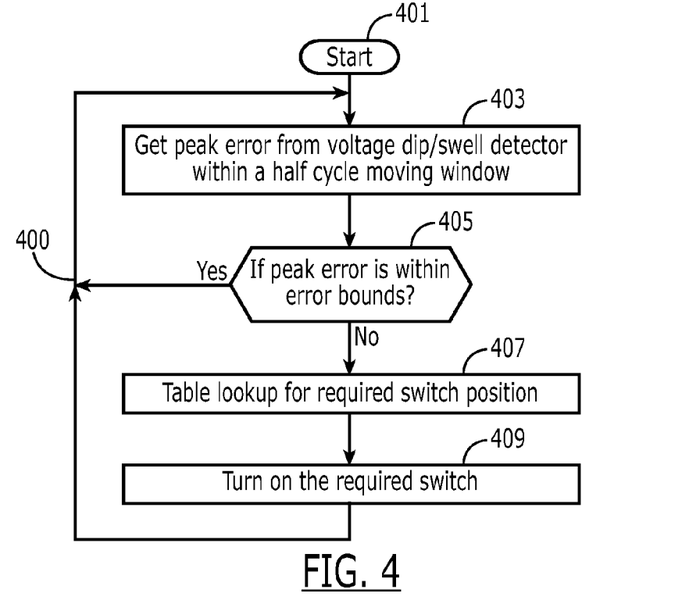
FIG. 4 is an embodiment of a method of the present invention.

FIG. 4 is a method of compensating for a voltage 400 in accordance with the instant invention.

Using a system containing a primary side of a transformer, a secondary side of a transformer with taps, a voltage dip/swell detector, a level detection/switch selector, the system is started 401 following the delivery of a supply voltage from a source to the primary side of the transformer. Through the voltage dip/swell detector, an error voltage is determined. As stated earlier, the error voltage is determined by the comparison of a fixed magnitude sinusoidal supply voltage signal and a supply reference voltage signal. Comparison is accomplished through a comparator, which is preferably a subtractor. The error voltage is delivered to the level detection/switch selector device for a determination if the error voltage is within an acceptable range 405. The acceptable range can be determined by a specific locales' regulations. Generally, an acceptable range can be between ±1 to 5% of the nominal supply voltage. If the error voltage is within the acceptable range, the system will loop, going again to determine the error voltage and whether the error voltage is within the acceptable range.

If the error voltage is not in an acceptable range, this will trigger the selection of a particular switch, such switch corresponding to a tap position. The selection of the tap position will compensate for a supply voltage dip or undervoltage. Upon the error voltage going outside the acceptable range, a circuit may be actuated, for example a switch, to initiate the selection of the required switch 407. The selection of the required switch 407 will be made based upon the measured error voltage level. Each available switch will correspond to a tap, with each tap correspondingly maintaining the load voltage at a nominal value. Such concept is evidenced by the general formula, $$V_L(t)=V_s(t)+1/n(V_s(t))$$

where
  $V_L(t)$=load voltage
  $V_s(t)$=source voltage
and
  n=number of turns on the secondary side transformer, whereby n is elected by the actuation of the corresponding switch. Where a dip in supply voltage occurs, the larger the dip the lower n should be to compensate thereof. This embodiment is an automatic selection of the switch.

In another embodiment, the switch selection may be made manually, wherein an operator, upon receiving notice of a voltage dip or undervoltage outside the acceptable range, such as by audio or visual signal, will activate an appropriate switch, upon say a control panel, that will select the tap to adjust the turns of the secondary side transformer.

Upon determining the appropriate switch, the switch will turn on 409, thus adjusting the number of turns on the secondary side transformer.

The system will continue to operate, characterized by the most recent switch selections and turns ratio. However, error voltage readings will continue to be made to determine when the supply voltage has returned to nominal operating conditions.

Figure 5:
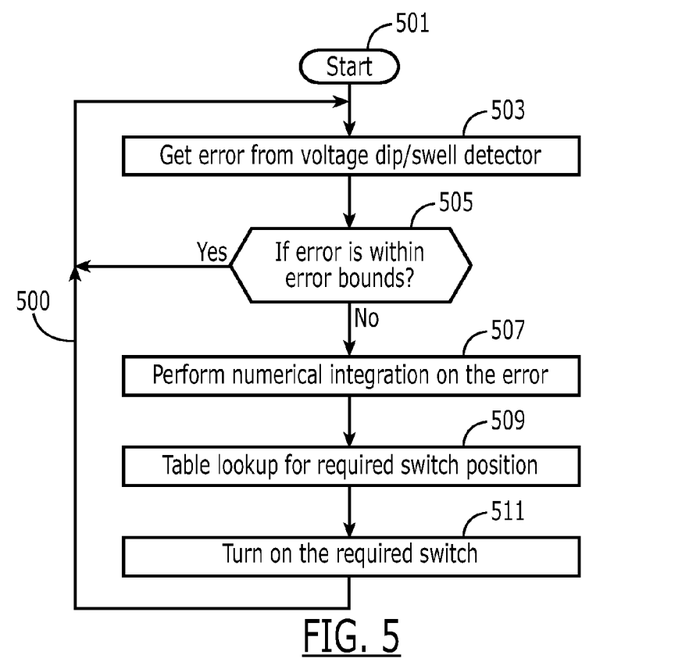
FIG. 5 is a further embodiment of a method of the present invention.

FIG. 5 is another embodiment of the method of compensating for a source voltage 500 using a system of the instant invention.

The embodiment 500 comprises the steps of obtaining the load voltage 501 to the primary side transformer for delivering a voltage dip and swell detector, the determination of an error voltage 503 using a rectified supply voltage signal and the reference signal delivered to a subtractor, determining whether the error voltage 505 is within the acceptable range, and if so looping the method to continue measuring for the error voltage. If the error voltage is outside the acceptable range, the error voltage is delivered to an integral controller for numerical integration 507. Numerical integration is performed 507 to address differences in time between a supply voltage dip and swell, and the adjustment of the secondary side transformer turns to meet the dips or unders. Following, the level of the error voltage determines the appropriate switch position 509 which, as stated previously, corresponds to an appropriate number of turns to adjust the supply voltage. Lastly, the switch is actuated 511. The method operates in a loop function, thus allowing the system to continually determine and adjust for supply voltage unders or dips.

EXAMPLE

A setup was made in accordance with the instant invention, wherein the nominal supply voltage is 100 Vrms and the supply frequency is 50 Hz. The system possessed an acceptable range of dip and swell of ±5%. This corresponded to an error voltage from the voltage dip/swell detector of ±5V. The frequency of sampling of the supply voltage was set at 2 KHz.

Figure 6:
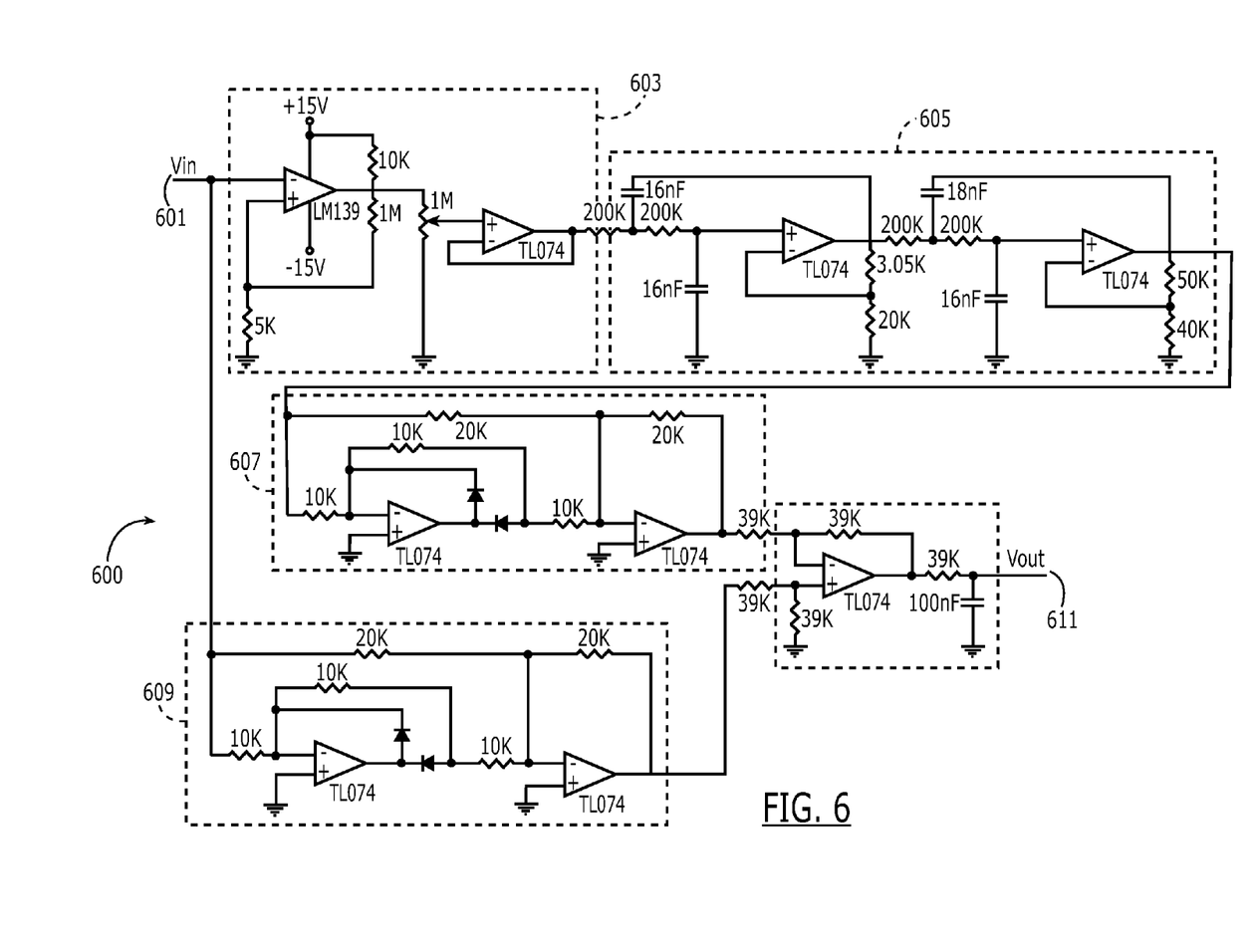
FIG. 6 is a circuit diagram of a detector that may be incorporated within the present system.

FIG. 6 is a circuit implementation of the voltage dip/swell detector 600 containing a supply voltage in 601, a square wave relay with inverter 603, a $4^{th}$ order Butterworth approximated filter 605, an absolute value generator 607, a reference signal absolute value generator 609, a subtractor 611, and an error voltage output. All components of the detector 600 are electronically coupled.

The system included a secondary side transformer possessing 14 switch positions. Each switch position corresponded to a modification of turns of the secondary side. Table 1 below sets forth the rules relating to the integral controller output and the required turn ratios and switch positions.

| controller output | switch position | turn ratio 1/n |
| --- | --- | --- |
| <5% | 1 | <0.05 |
| >5% | 2 | 0.1 |
| >10% | 3 | 0.2 |
| >15% | 4 | 0.3 |
| >20% | 5 | 0.4 |
| >25% | 6 | 0.5 |
| >30% | 7 | 0.65 |
| >35% | 8 | 0.8 |
| >40% | 9 | 0.95 |
| >45% | 10 | 1.1 |
| >50% | 11 | 1.3 |
| >55% | 12 | 1.5 |
| >60% | 13 | 1.75 |
| >65% | 14 | 2.0 |

Where the first column is the percentage of the controller output, the second column is the switch position, and the third column is the corresponding turn ratio.

As shown by the above table, with the turn ratio in accordance with the instant invention, the system can handle a voltage dip or undervoltage of up to 68%. Thus, with as few as 14 transformer taps, a load voltage can be regulated to have less than a 5% variation from the nominal supply voltage. This allows meeting undervoltage requirements for an significant period of time. Further, in embodiments using integral controllers and the voltage dip/swell detector, the system is able to react to a voltage dip in around one cycle of oscillation.

Figure 7:
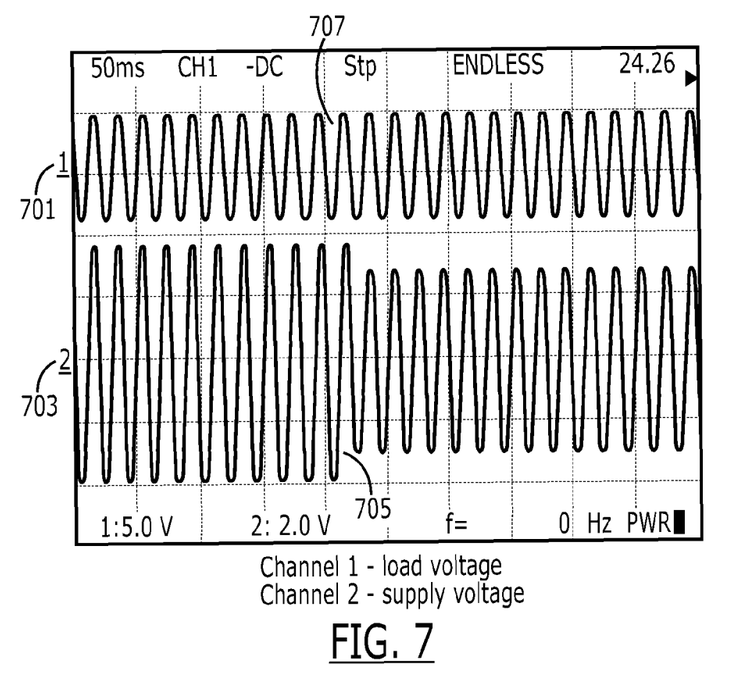
FIG. 7 is an example of a load voltage adjusted to meet a dip in the supply voltage, in accordance with the present invention.

FIG. 7 is an example of the results using the present system, whereby the output load voltage is 1 701 and the supply voltage is 2 703. As shown, at about a 22% supply voltage dip 705, the load voltage recovered to less than a 5% deviation from the nominal supply 707, in around one cycle of oscillation.

Figure 8:
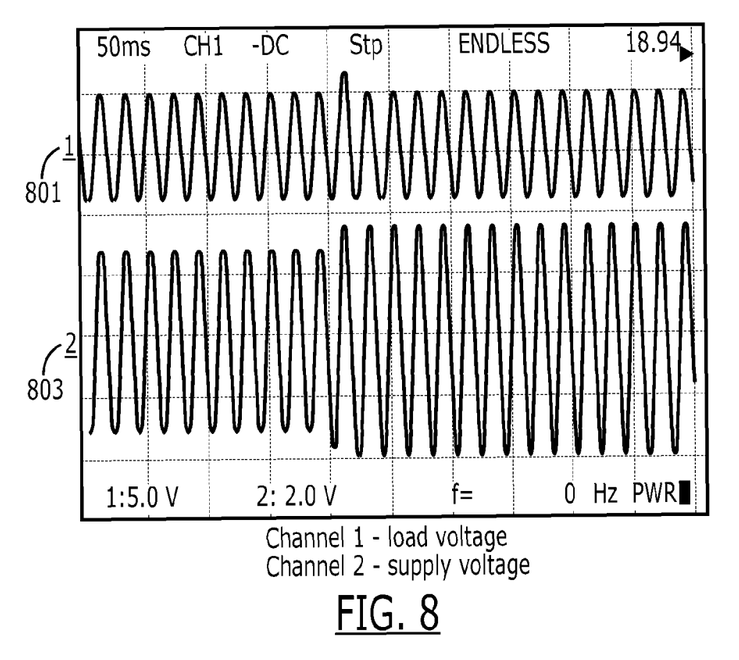
FIG. 8 is an example of a load voltage recovering from a voltage dip going back to normal, in accordance with the present invention.

FIG. 8 is an example of the system following the recovery of the supply voltage to its acceptable range, wherein when the supply voltage recovers from a 22% dip 801, the load voltage recovers to less than 5% deviation 803 from the nominal supply in around one cycle of oscillation.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. A system for compensating for a voltage dip and undervoltage, comprising,
   a transformer with a primary side and a secondary side, wherein said secondary side contains switches and a sufficient number of taps;
   a voltage dip/swell detector electronically coupled to said primary side; and
   a level detector/switch selector device electronically coupled to said voltage dip/swell detector;
   wherein said level detector/switch selector device is electronically coupled to said secondary side of said transformer,
   wherein the primary side and the secondary side are directly and electronically coupled to a common supply voltage, and
   wherein said voltage dip/swell detector is comprised of a relay with inverter, a low pass filter, an absolute value generator for a rectified source voltage signal, an absolute value generator for a reference source voltage signal, and a comparator.

2. The system of claim 1, further comprising a deadzone positioned between said voltage dip/swell detector and an integral controller, said integral controller positioned before said level detection/switch selector device.

3. The system of claim 1, wherein said secondary side of said transformer contains 14 switches and 14 taps.

4. The system of claim 1, wherein said low pass filter is selected from the group consisting of Butterworth approximated filters, Chebyshev approximated filters, Cauer approximated filters, and Bessel approximated filters, with an order of between $3^{rd}$ or above.

5. The system of claim 1, wherein said low pass filter is a $4^{th}$ order Butterworth approximated filter.

6. The system of claim 1, wherein said comparator is a subtractor.

* * * * *